United States Patent [19]
Bellis et al.

[11] Patent Number: 5,288,841
[45] Date of Patent: Feb. 22, 1994

[54] FLUIDIZED BED RING-OPENING POLYMERIZATION PROCESS

[75] Inventors: Howard E. Bellis, Wilmington, Del.; Donald C. Paul, Landenberg, Pa.

[73] Assignee: E. I. Du Pont de Nemours and Company, Wilmington, Del.

[21] Appl. No.: 984,005

[22] Filed: Nov. 30, 1992

Related U.S. Application Data

[63] Continuation of Ser. No. 580,525, Sep. 11, 1990, abandoned.

[51] Int. Cl.$^5$ .............. C08G 69/16; C08G 63/08; C08G 61/12
[52] U.S. Cl. .................. 528/275; 528/272; 528/277; 528/278; 528/323; 528/354; 528/357; 528/370; 528/425; 526/64
[58] Field of Search ............ 526/63, 901, 88, 64; 528/272, 275, 276, 283, 285, 355, 357, 358, 323, 371, 354, 370, 425, 277, 278

[56] References Cited

U.S. PATENT DOCUMENTS

| | | | |
|---|---|---|---|
| 3,325,455 | 6/1967 | Warner | 528/323 |
| 3,578,700 | 5/1971 | Klootwijk et al. | 528/359 X |
| 3,632,669 | 1/1972 | Lundberg et al. | 528/355 |
| 3,773,726 | 11/1973 | Vollkommer et al. | 528/358 |
| 3,879,352 | 4/1975 | Ames et al. | 528/358 X |

FOREIGN PATENT DOCUMENTS 1149148 4/1969 United Kingdom ............ 528/359

*Primary Examiner*—Fred Teskin

[57] ABSTRACT

An improved process for the ring-opening polymerization of ring-opening polymerizable cyclic compounds using a fluidized bed.

10 Claims, No Drawings

FLUIDIZED BED RING-OPENING POLYMERIZATION PROCESS

This application is a continuation of application Ser. No. 07/580,525 filed Sep. 11, 1990.

FIELD OF INVENTION

This invention relates to an improved process for the ring-opening polymerization of ring-opening polymerizable cyclic compounds, including cyclic carboxylic esters and lactams. In particular, it relates to a continuous process which comprises effecting the polymerization of the cyclic compound in the presence of a particulate solid catalyst (polymerization initiator) maintained as a fluidized bed of particles by a fluidizing flow of gas. It further relates to the production of the polymerized (open-chain) product in directly useable particulate form.

Polymers of ring-opening polymerizable cyclic esters and lactams are well known for their hydrolytic and biodegradable properties. For example, polymers of cyclic esters such as glycolide (1,4-dioxane - 2,5-dione) have long been of interest for such biomedical uses as sutures and staples. More recently, polymerized cyclic esters and lactams have become of interest for the manufacture of articles for non-medical uses that would degrade in the environment, in particular hydrolytically, to environmentally acceptable products.

Prior processes for the polymerization of ring-opening polymerizable cyclic compounds such as lactones (including dimeric cyclic esters of alpha-hydroxycarboxylic acids), lactams, oxalates and carbonates are, in general, batch operations wherein the cyclic compound, neat or dissolved in a compatible solvent, is heated under agitation in the presence of a polymerization-initiating catalyst for a period of time often ranging from hours to days and at highly elevated temperatures to drive the polymerization to completion.

The polymeric product accumulates in the reaction vessel as a viscous liquid, semi-solid or solid or as a solution in a compatible solvent. Such processes for the preparation of the polymeric products are not entirely satisfactory for large scale commercial operation in view of the relatively high cost of batch processes.

Further, removal of the polymer from the reaction zone and its recovery in handleable form present problems. Removal of viscous liquids, as by draining, even under pressure, is slow and time-consuming unless facilitated by use of solvents to solubilize the polymer and reduce the viscosity of the mass. Removal of solid products by melt-extrusion, for example, is also slow; and recovery by sacrificing the reaction vessel, a common expedient in the laboratory, is impractical in commerce. Solid products obtained in massive forms are generally ground to powders for convenient handling in downstream operations.

Solvent use to assist in the removal of product, whether liquid or solid, and whatever the process of manufacture, is economically undesirable as it necessitates the further steps of separating the polymer from the solvent, often with loss of product, and of removing residual solvent from the polymer, all costly.

A solvent-based process for the bead-polymerization of glycolide, lactide and other such cyclic esters is also known (U.S. Pat. No. 2,951,828). The cyclic ester is suspended in an inert hydrocarbon solvent containing a dihydrocarbon siloxane oil as suspension stabilizer and polymerization is effected with a metal halide initiator. The patent states the bead-polymerizate is formed in a single process step, in contrast to prior art processes, and can be worked up directly into ribbons, rods, foils, fibers and the like without any intervening additional solution, precipitation or granulating step. Such process, however, suffers the same disadvantages of other operations utilizing solvents.

The art also discloses a ring-opening process for preparing "living" prepolymers of alpha, alpha-dialkyl-beta-propiolactones utilizing various nucleophilic agents free of active hydrogen, which is preferably a tertiary phosphine, arsine, stibine or amine (U.S. Pat. No. 3,578,700). The patent states "The process is suitably carried out in a liquid inert diluent, though gaseous diluents may be used, if desired, e.g., in a fluid-bed-type reactor." Preferred diluents are liquid hydrocarbons.

The living prepolymers are disclosed to have molecular weights in the range of from about 200 to 10,000 and to be suitable initiators for the polymerization of beta-lactones. For example, a prepolymer prepared from pivalolactone and triphenyl phosphine in boiling 1-2 dimethoxyethane and having a molecular weight of 7200 is shown to initiate the polymerization of pivalolactone in solution in a liquid hydrocarbon.

There is no description of a fluid bed process for the preparation of the prepolymer utilizing a gaseous fluidizing agent, and no suggestion that the living prepolymer could be used as a polymerization initiator in a fluid bed process for the preparation of higher molecular weight polymers.

It is an object of this invention to provide an improved process for polymerizing ring-opening polymerizable cyclic compounds which minimizes/overcomes the drawbacks associated with prior art polymerization and recovery methods.

Another object is to provide a fluid bed process for such polymerization, more particularly a continuous fluid bed process, which enables the polymerized product to be recovered directly from the fluidized bed reaction zone in a particulate form convenient to handle such as beads and bead-like particles.

Still another object is to provide processes as above for the ring-opening polymerization of ring-opening polymerizable lactones, lactams, alkylene oxalates and alkylene carbonates, preferably lactones of hydroxycarboxylic acids including dimeric cyclic esters of alpha-hydroxycarboxylic acids.

Further objects are to provide new particulate solid polymeric compositions, including compositions consisting essentially of the reaction products of the polymerizable compounds and the polymerization initiators.

SUMMARY OF THE INVENTION

In the process for the ring-opening polymerization of a ring-opening polymerizable cyclic compound which comprises contacting the cyclic compound under polymerizing conditions in a reaction zone with a polymerization initiator effective to initiate and promote the polymerization of the cyclic compound to a solid polymer, the improvement which comprises contacting the cyclic compound in the vapor state with a particulate solid initiator maintained in the reaction zone as a fluidized bed by a fluidizing flow of a gas stream, whereby the cyclic compound is converted to a particulate solid polymeric composition.

The invention also provides novel particulate polymerize solid compositions prepared by the invention process. It also provides particulate solid living end polymer product compositions consisting essentially of a reaction product of a ring-opening polymerizable cyclic compound and a particulate solid ring-opening polymerization initiator. It further provides such living end polymer product compositions in the form of fluidizable solid particles capable of initiating the polymerization of ring-opening cyclic monomers.

Other specific and independent embodiments include:

(a) Continuously contacting the cyclic compound with the particulate initiator in the fluidizing gas stream in the reaction zone, preferably by feeding the cyclic compound to the reaction zone as a vapor component of the gas stream, maintaining the contact at a temperature and pressure and for a time effective to form a particulate solid product composition consisting essentially of the polymer and the initiator, and separating the particulate solid polymer product composition from the gas stream;

Continuously feeding the fluidizing gas stream containing the cyclic monomer up through a bed of the particulate initiator on a suitable support at the lower end of the reaction zone, removing a gas stream at the upper end of the reaction zone containing particulate solid polymeric reaction product and separating the gas from the solid product;

(c) Alternatively, passing the fluidizing gas stream containing the cyclic monomer up through an unsupported bed of the particulate solid initiator, allowing particulate solid polymeric reaction product to accumulate at the lower end of the reaction zone below the point at which the gas stream is introduced into the reaction zone, removing the gaseous components of the gas stream at the top of the reaction zone and removing particulate solid product from the bottom of the reaction zone;

(d) Employing as the ring-opening polymerizable cyclic compound, a cyclic carboxylic ester or lactam, preferably a cyclic ester which is at least one of a lactone, an alkylene oxalate and an alkylene carbonate, more preferably a lactone which is (a) a cyclic ester of a beta or higher positioned hydroxysubstituted aliphatic carboxylic acid and/or (b) a dimeric cyclic ester of an alpha-hydroxy alphatic carboxylic acid;

(e) Employing as the cyclic compound at least one dimeric cyclic ester having the formula

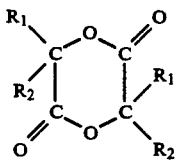

where each R group is independently H or a $C_1$-$C_6$ hydrocarbyl or substituted $C_1$-$C_6$ hydrocarbyl group, preferably is H or a $C_1$-$C_3$ alkyl group, more preferably H or methyl, said dimeric cyclic ester being employed alone or together with another cyclic ester or a lactam.

DETAILED DESCRIPTION OF THE INVENTION

The invention fluid bed polymerization process for the preparation of novel polymeric compositions broadly involves fluidizing a bed of particles of a ring-opening polymerization initiator "catalyst" of the art) by passing a stream of gas up through the bed sufficient to fluidize the bed so that the particles are fluidized in intimate contact with the gas stream, and contacting the fluidized bed of initiator particles with a vaporized ring-opening polymerizable compound (monomer), preferably introduced as a component of the fluidizing gas stream, under conditions of temperature and pressure and time effective to form a particulate solid polymeric product composition consisting essentially of the reaction product of the monomer and the initiator. The process may be semi-continuous wherein the fluidizing gas containing the monomer is continuously fed to the reaction zone and the polymeric reaction product is allowed to accumulate therein and the gas allowed to continuously exit the zone. It can also be fully continuous wherein the solid reaction product is continuously separated from the fluidizing gas and recovered, and make-up polymerization initiator is continuously fed to the reaction zone and fluidized therein in contact with the gas-monomer stream.

The invention process enables the production of the polymeric products directly as free-flowing generally bead-like solids useable in many downstream applications without need for further processing. The polymers have molecular weights of at least 10,000, preferably at least about 20,000, and up to about 500,000. By "bead-like" is meant having a reasonably spherical or elliptical shape as opposed to plate-like.

The invention process is applicable to the polymerization of a variety of vaporizable ring-opening polymerizable cyclic compound, hereafter monomers. By "vaporizable" is meant exerting sufficient vapor pressure at practical temperatures and pressures, as more fully disclosed below, to be fed directly to the reaction zone or to be entrained into the reaction zone as vapor in an inert fluidizing gas stream. The cyclic monomers include cyclic carboxylic esters, such as lactones, oxalates and carbonates, and such nitrogen analogs as lactams. By "lactones" is meant to include both monomeric cyclic esters of beta-and higher (preferably gamma and higher) hydroxycarboxylic acids and dimeric cyclic esters of alpha-hydroxycarboxylic acids defined earlier. Ring-opening polymerizable cyclic carboxylic esters and lactams are well-known in the art, and for the present purpose can be represented by the formula, X—G—(O)$_s$—(CO)$_t$CO, where: X is O or NH, preferably O; G is a divalent organic radical such as alkylene, oxaalkylene, azaalkalene or alkylene having a carboxylate, —CO$_2$—, group interposed between carbon atoms in the chain of carbon atoms; s=o or 1 and t=o or 1 with the proviso that when s=o, t=o. When s=o, t=o and X is an oxygen atom, the cyclic monomer is a lactone; when s=o, t=o and X=NH the cyclic monomer is a lactam. When s=1, t=o and X is oxygen, the monomer is a cyclic carbonate. When s=1, t=1 and X is oxygen, the cyclic ester is an oxalate.

Generally, G will contain at least 2 and, normally not more than 7, atoms in the divalent chain of atoms, preferably from 4 to 6, so as to form a cyclic compound having 4 to 9, preferably 6 to 8 atoms in the ring. The divalent G radicals may contain one or more compatible substituents, that is, substituents that do not sterically or reactively prevent polymerization to an open-chain polymer.

Representative divalent G radicals are: alkylenes having the formula —(CR$_2$)n—, where n=2 to 7, preferably 4 to 6; oxa-and azalkylenes having the formula —$(CR_2)_n$—Y—$(CR_2)_p$—, where Y=O, S, NR or PR, preferably O, m=1 to 2, p=1 to 2 with m+p preferably=3 to 4; alkylenes having —$CO_2$—within the chain and having the formula —$CR_2$—$CO_2$—$CR_2$—; where R in all the above occurrences is independently H, hydrocarbyl or hydrocarbyl substituted with compatible substituents. Preferably R is H or $C_1$-$C_3$ alkyl, more preferably methyl.

Typical monomeric cyclic esters and lactams include beta propiolactone, gamma-butyrolactone, delta-valerolactone, alpha, alpha-dimethylpropio lactone, epsilon-lactone, gamma-methyl-epsilon-caprolactone, beta, beta-dimethoxy-delta-valerolac-tone, zeta-enantholactone, eta-capryllactone, caprolactam, 4-methylcaprolactam, 1,4-dioxane-2-one, 1, 4-morpholine-2-one, N-methyl-1,4-morpholine-2-one, 1,4-dioxepane-2-one and 1.5-dioxepane-2-one.

Typical dimeric cyclic esters include glycolide, tetramethylglycolide, diethyl glycolide, lactide, the dimeric cyclic ester of alpha-hydroxy caproic acid and the like. Preferred are glycolide, lactide (including L-, D- and meso-lactide) and mixtures of glycolide with one or more of the isomeric lactides. Representative and preferred cyclic carbonates and oxalates include ethylene carbonate, 1, 2-propylene carbonate, trimethylene carbonate, ethylene oxalate and 1, 2-propylene oxalate.

The cyclic compounds may be employed singly to produce homopolymers, or as mixtures of two or more thereof to form random copolymers, or sequentially to form block copolymers having two or more blocks. Thus, the polymeric products produced in accordance with the method of this invention typically contain one or more of the following units:

(1) $[X(CR_2)_nCO]_u$
(2) $[OCR_2CO_2CR_2CO]_v$
(3) $[O(CR_2)_m\text{-}Y\text{-}(CR_2)_p\text{-}CO]_w$
(4) $[O(CR_2)_q\text{-}O\text{-}CO]_y$
(5) $[O(CR_2)_r\text{-}O\text{-}COCO]_z$ where n=2 to 7, preferably 4 to 6; m=1 to 2; p=1 to 2; m+p preferably =3 to 4; q=2 to 3; r=2 to 3; X=O or NH; Y=O, S, NR or PR; R is independently H, hydrocarbyl or substituted hydrocarbyl and preferably, when other than H, is alkyl, more preferably lower-alkyl, most preferably methyl; each of u, v w, y and z is an integer including zero and the sum u+v+w+y+z is 2 or more, provided that the polymer is solid at ambient temperatures. Preferred polymeric compositions contain major proportions of the number (2) units and at most minor proportions of any one or more of the (1), (3), (4) and (5) units described above.

The polymerization initiator may be any of those known in the art as "catalysts" for promoting ring-opening polymerization of such ring-opening polymerizable cyclic compounds as lactones (including dimeric cyclic esters), alkylene oxalates, alkylene carbonates and lactams provided it is inherently solid under the process conditions or is supportable on a suitable solid support, which itself may exhibit ring-opening catalytic capability. The catalyst composition, supported or unsupported, will be sufficiently particulate so as to present a high surface area and be fluidizable in a stream of a fluidizing gas. The particulate solid initiator may also be formed in situ as described below.

More specifically, the initiators are generally metals of Groups I through VIII of the Periodic Table or compounds of such metals exemplified by their organo-derivatives, oxides, alkoxides (including alkoxides of hydroxy carboxylic acids and esters) halogenides, carboxylates, beta-diketonates and the like, wherein the metal is bonded to a carbon, halogen or oxygen atom of the associated radical. Representative of the initiator metals and their compounds are: butyl lithium, phenyl lithium, vinyl sodium; diethyl magnesium, ethyl magnesium chloride; magnesium, calcium and barium oxide; calcium formate; zinc (powdered); zinc oxide, borate, carbonate, basic carbonate and diethyl aluminate; dibutyl zinc, diethyl zinc; cadmium oxide, dimethyl cadmium; tributyl aluminum, aluminum chloride, aluminum oxychloride, aluminum isopropoxide; tin (powdered), stannous oxide, stannous chloride, dibutyl tin oxide, dibutyl tin dilaurate, dibutyltin dimethoxide, stannic chloride, stannic fluoride, stannous $C_1$-$C_{18}$ alkanoate, preferably the octoate, stannous oxalate; antimony trifluoride, antimonous oxide ($Sb_2O_3$); molybdenum, chromium, manganese, cobalt, and iron dialkyl aluminate; ferric chloride; yttrium, lanthanum and other rare earth metal (atomic number 57-71) alkoxides, amides and organo metallic compounds, such as yttrium tris(isopropoxide), yttrium tris(2-ethoxyethoxide), yttrium tris(2-phenylethoxide), yttrium tris(2-dimethylaminoethoxide), tris(4-hydroxymethyl-benzyloxide), yttrium tris(1-methoxycarbonylethoxide), yttrium tris(vitamin d3 alkoxide), yttrium tris(trimethylsilylmethyl), yttrium tris[N,N-bis(trimethylsilyl)amide], samarium tris(2-dimethylaminoethoxide) and dysprosium tris(2-dimethylaminoethoxide). It will be appreciated from the above listing that the term "alkoxide" is not limited to alkoxide groups composed solely of C,H and O. The term is also meant to include complex alkoxides of yttrium and the rare earth metals such as S2M (alkoxide)7, where S is a divalent cation such as barium or other Group IIA metal, exemplified by $Ba_2$ Y[O $CH_2CH_2$ N$(CH_3)_2$]and $Ba_2$ Y(O $CH_2CH_2OCH_2CH_3)_7$. Preferred initiators are the Group IV metals and their compounds, in particular tin, especially as the divalent tin $C_1$-$C_{18}$ carboxyates, e.g., stannous octoate. Also preferred are the yttrium and rare earth metal alkoxides; in particular those composed of yttrium, lanthanum and mixtures of yttrium obtained from the mining and smelting rare earth metal oxides.

The initiators (catalytic materials) may be employed singly or as mixtures and may be unsupported solids or supported on an inert solid carrier, which may or may not be catalytic for the present purpose. Typical supports include carbon, alumina, silica, titania, zirconia, nobia and combinations thereof, such as the aluminosilicate, titanates and zirconates. The support may also be a solid organic polymer such as polyethylene, polypropylene, polystyrene, a poly(hydroxycarboxylic acid or ester), e.g., a polyglycolide, polylactide, poly (glycolide-lactide) or other polymer product of the present invention process.

Supported catalysts may be made by any of the methods known in the art, including impregnating or coating the support with a solution or slurry of the catalytic agent in a suitable solvent, separating the coated and/or impregnated support from the solvent and drying, including spray drying, for solvent removal, and comminuting the solid product to a desired degree of subdivision, e.g., to a size in the range of about 5 to 500 microns in the longest dimension. Spray-drying is a preferred method of producing particulate catalysts in that it, in general, yields microspheroidal particles. Microspheroidal particles tend to suffer less fracturing and abrasion to fines under fluidizing conditions of the polymerization process. The initiators should, of course, be prepared under anhydrous and inert conditions and maintained as such before and during their use in the present process.

The particulate solid initiator may also be formed in situ by incorporating into the reaction zone a normally non-solid or difficult to handle initiator, such as butyl lithium, diethyl magnesium, dimethyl cadmium or the like organometallic compound either as vapor or as a liquid, neat or in an inert solvent sprayed into the reaction zone, where it can react with the cyclic monomer of the gas stream to form solid initiator particles dispersed in the stream and consequently polymeric reaction product as well. Alternatively highly sensitive initiators, such as the organometals, can be deposited on an inert support, such as beads of a polyolefin or a polyether.

It should be noted the polymerization-initiating and promoting metallic alkoxides of hydroxycarboxylic acids include metallic derivatives of the open-chain monomeric and polymeric hydroxycarboxylic acid moieties formed by ring-opening of the lactones, alkylene oxalates and alkylene carbonates described above. It is believed in the open-chain units represented for example by formulas 1 to 5 above, the metallic moiety of the initially-employed polymerization initiator is associated with the terminal alkoxide oxygen atom of those units. Likewise, it appears that the metallic group is associated with the terminal nitrogen atom of an open-chain composition derived from a lactam, viz. formula 1 above where X=NH, and that such metallic open-chain monomeric or polymeric unit is likewise capable of initiating and continuing the polymerization.

Thus, the initiator, whatever its initial composition, serves primarily to generate a living end open-chain composition, containing one or more units represented by formulas 1 to 5 above, which then serves as the essential intermediate leading to polymer growth on subsequent reaction with additional ring-opening polymerizable monomer. This is illustrated in equations 1 and 2 below with stannous octoate, $SnZ_2$, where $Z=C_7H_{15}CO_2$, and a cyclic ester, $O-G-C=O$, where G is as defined above.

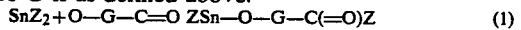

$$SnZ_2 + O-G-C=O \rightarrow ZSn-O-G-C(=O)Z \quad (1)$$

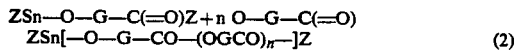

$$ZSn-O-G-C(=O)Z + n\,O-G-C(=O) \rightarrow ZSn[-O-G-CO-(OGCO)_n-]Z \quad (2)$$

where n is an integer of at least 1 and G may be the same or different in equations 1 and 2.

Quenching of the living end polymer, as by reaction with water or aqueous acid, which may contain a sequestering agent for the metal ion, yields the poly(-hyroxy-or amino-carboxylic acid) form of the product (equation 3),

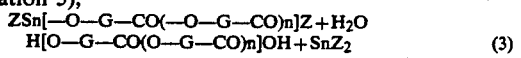

$$ZSn[-O-G-CO(-O-G-CO)n]Z + H_2O \rightarrow H[O-G-CO(O-G-CO)n]OH + SnZ_2 \quad (3)$$

However, so long as the product of equation 2 remains unquenched, it is capable of reacting with additional cyclic monomer.

If the monomer is the same as previously used, the resulting polymer will be a homopolymer of higher molecular weight. If the monomer is structurally or compositionally different, the resulting higher molecular weight polymer will be a block copolymer. Random copolymers can be made by simultaneously contacting a polymerization initiating catalyst or living end polymer with two or more ring-opening polymerizable cyclic monomers.

The living end polymer may be stored under inert, i.e., dry non-quenching, conditions; and then used to further polymerize suitable cyclic monomers. Those skilled in the art will appreciate that the constitution of the non-living end group will vary with the nucleophilic group of the initiator (e.g., Z in $SnZ_2$) and on the stability of the end group (e.g., —COZ in equations 1 and 2) and on its reactivity under quenching conditions (equation 3).

It will be appreciated that the unquenched products of equations 1 and 2 need not be prepared by the method of this invention to serve as an initiator for the present purpose. The initiator can be prepared by any of the methods of the art; and, so long as it is in the unquenched (living end) state, it need only be solid and in a particulate fluidizable form or supportable on a fluidizable support.

The gaseous agent for fluidizing the bed of solid initiator particles and for carrying vapors of the cyclic monomer into contact with the initiator in the reaction zone may be any substance that is gaseous and stable at the operating temperatures and pressures and is inert to the monomer, initiator and the polymeric product. It may be normally (and preferably) gaseous, such as nitrogen, argon carbon dioxide or a low molecular weight hydrocarbon or halocarbon. It may be normally non-gaseous but gaseous at the reaction temperature and pressure. Preferred is nitrogen for its inertness and ready availability. Preferably the gas is preheated to or reasonably close to the operating temperature. The gaseous monomer stream can also be a gas stream produced in an upstream process and comprising a fluidizing gas and a cyclic monomer described herein. For example, it can be the gaseous effluent from a process for the depolymerization of oligomeric cyclic esters as disclosed in Bhatia, U.S. Pat. No. 4,835,293, more particularly such product stream containing glycolide and-/or lactide from the depolymerization of the corresponding poly(hydroxycarboxylic acid).

The quantity of gas relative to that of the cyclic monomer and of the initiator should be such as to vaporize and carry a substantial amount of the monomer into the reaction zone, raise a bed of particles of the initiator and maintain it fluidized and in substantially complete contact with the gas-monomer vapor stream throughout the course of the reaction. The relative quantities of gas, monomer and initiator as well as the gas flow rate, which may vary with any particular combination of monomer and initiator, initiator particle size, temperature, pressure, contact time and degree of conversion to the polymer desired, can readily be determined by those skilled in the art.

Suitably effective temperatures for converting monomer to polymer can also vary widely. The temperature should be sufficiently high to provide a substantial amount of the monomer in the vapor state at the operative pressure but not so high as to result in its degradation. Also, it should be sufficiently high to promote the monomer-to-polymer conversion but not so high as to result in a molten or sticking polymer or in the degradation of the polymer including depolymerization to monomer. In short, it should be high enough to yield solid polymer and below the sticking point of the polymer. Generally, the operating temperature is in the range of from about 20° to about 190° C., preferably not higher than about 170° C., depending upon the above considerations. Also, with the yttrium and rare earth metal-based initiators the temperatures can be lower than that employed in the prior art bulk polymerizations of the subject monomers. Also, it can be lower than the boiling point of relatively high boiling monomers, e.g., L-lactide, but which can be entrained as vapor from the molten state into a reaction zone and polymerized in accordance with the invention gas-solid contact method at lower temperatures.

The reaction pressure may vary from sub-atmospheric to atmospheric to super-atmospheric. Preferably it is at least about atmospheric, as it is more convenient to handle the gas feed and product streams at such pressures; and normally will not be greater than about 3 atmospheres.

The contact time may vary widely. It may be as low as a fraction of a second and as high as several minutes depending on the particular cyclic monomer and its reactivity, on the initiator and its relative effectiveness for initiating ring-opening polymerization and on the operating temperature. In general, the higher the temperature, the faster the reaction. The contact time, coordinated with the temperature, should be sufficient to result in a non-sticky product. Too short a contact and/or too low a temperature can result in tendency for the particulate product to agglomerate. Suitable combinations of time and temperature of reaction are readily determinable with any particular monomer and initiator.

The reactor design and configuration is not critical provided it provides a reaction zone that can accomodate a bed of initiator particles, has means for feeding a gas stream containing vaporized cyclic monomer into the reaction zone so that it can intimately contact the bed of initiator particles and raise it into a fluidized state, and means for removing the polymeric reaction product from the reaction zone, i.e., polymer in intimate association with an initiator particle. The reactor may be any design known in the art for effecting gas-solid contact wherein the solid is disposed as a bed of fluidizable particles. For example, it may be a tubular reactor, vertically disposed and adapted to contain a fluidizable bed of the initiator, and fitted with the necessary means for feeding gas and cyclic monomer at a point below the bed of initiator particles, means for removing the gas-product stream from the top of the reactor and means for continuously or intermittently feeding make-up quantities of the initiator particles as deemed necessary. The initiator particles, initial or make-up, may be fed directly into the gas-monomer feed stream or into that section of the reaction zone to be occupied by the initiator via a port in the wall of the reactor. The reactor may be equipped with gas-redistributing baffles and with heating means, which may jacket the reaction zone or be disposed within it as tubes in heat exchange-relationship with the gas-solid reaction mixture.

In one embodiment of the invention, the polymeric product along with the initially charged bed of initiator particles is allowed to accumulate in the reaction zone, so that the gas stream exiting the reactor consists essentially of the gas and unreacted monomer, if any, which may be recycled to the reactor. In other words, the gas flow can be sufficient to fluidize the bed of particles but insufficient to carry the particles with its associated load of polymeric product out of the reaction zone. In such case, the polymeric reaction product can be allowed to fall to and be withdrawn from the bottom of the reaction zone.

Where the gas flow is sufficient to carry the polymer-initiator particle composition out of the reaction zone, the stream will pass to a separation zone, which, for example, may be a cyclone separator to remove the solid product from the gas stream and allow the solid-depleted gas stream to be recovered and recycled, if desired, to the reaction zone with a fresh complement of cyclic monomer to be polymerized. The polymeric product recovered from the gas stream and consisting essentially of polymerized monomer and one or more particles of solid initiator can be obtained as a mass of unagglomerated bead-like particles. These products may be employed as such in various applications. For example, if still in the living end state, they may be employed as a polymerization initiator, as described above. Also, if the presence of the metallic moiety originating with the polymerization initiator is not objectionable, they may be employed, unquenched or quenched, in the production of molded products, extruded films and fibers, cast films, polishes and waxes and the like, just like any prior art solid thermoplastic polymer of the same general constitution. They may also be used as hydrolyzable components of well-bore fluids for temporarily sealing subterranean oil well formations, as is known in the art for polymers of alpha-hydroxycarboxylic acids in general.

Where the metallic component may be objectionable as in biomedical uses, it can be removed by extracting a solution of the polymeric product, preferably a solution in a water-immiscible solvent, with an aqueous solution containing a sequestering agent for the metal ion or with a strong acid such as hychochloric acid. The metal-free product can be recovered from the solution in conventional ways.

The examples which follow are intended to illustrate the invention and are not to be construed as limiting it to any particular embodiment described therein.

EXAMPLE

A. Preparation of Polymerization Initiator

A living polymerization initiator was prepared by reaction of 0.001 grams of yttrium as the tris (2-dimethylaminoethoxide) with 18 grams of L-lactide in dry toluene solution at about 23° C. The resulting white precipitate was collected, dried by evaporating residual solvent at reduced pressure and ground to a powder having particle size ranging from about 50 to 250 microns. All operations were conducted under dry $N_2$ gas.

B. Fluid Bed Polymerization of L-lactide

The reactor employed consisted essentially of a vertically disposed tube, 1¼"by 24", and equipped with a heating jacket, a gas feed line at the lower end of the reactor and a gas exit line at its upper end, communicating with a cold trap(−80° C.).

Fifteen grams of the initiator prepared in (A) was placed in the reactor. Dry nitrogen gas was passed through 50 grams of molten (170.C) L-lactide at atmospheric pressure; and the gas stream containing entrained lactide vapors was introduced into the bottom of the reactor at a flow rate of 3 liters/ml which was sufficient to fluidize the particles and raise the suspended particles to a height of about 15–18". The reaction temperature was held at about 170° C. for 1 hour during which time about 40 grams of lactide were conveyed to the fluidized bed. The flow of $N_2$ and lactide was replaced by $N_2$ alone and fluidization was continued until the bed of polymeric particles had cooled to room temperature. The whitish particles removed from the reactor were free-flowing, reasonably spherical in shape and weighed 50 grams. The inherent viscosity, determined on 0.1 gram of material in 100 ml of methylene chloride at 20° C., was 0.8 indicating an average molecular weight of at least about 40,000.

In contrast the inherent viscosity of the initiator was less than 0.3, and that of lactide itself essentially nil. Also in contrast, conducting the above procedure at temperatures up to 120.C resulted in particles of product tending to cluster together. Clustering is attributed to incomplete polymerization of lactide absorbed on the surface of the particles and not yet completely incorporated into the growing polymer chain at the indicated temperature (above the m.p. of lactide) and flow rate employed (a measure of the contact time). Conducting the above procedure at 190.C again resulted in sticking of the particles, attributed to having reached the stick point of the particular polymer produced. At 170.C, however, the rate of incorporating the monomeric lactide into the polymer and the lower temperature were evidently sufficient to result in substantially "dry" non-sticking particles of polymer.

We claim:

1. In the process for the ring-opening polymerization of a ring-opening polymerizable cyclic compound which comprises contacting the cyclic compound under polymerizing conditions in a reaction zone with a metal or metal compound polymerization initiator effective to initiate the polymerization of the cyclic compound to a solid polymer, the improvement which comprises contacting a vaporizable, cyclic ring-opening polymerizable compound having 6 to 8 atoms in the ring in the vapor state with a particulate solid initiator maintained in the reaction zone as a fluidized bed by a fluidizing flow of a gas stream whereby the cyclic compound is converted to a particulate solid polymeric reaction product.

2. The process of claim 1, wherein the contact of the cyclic compound and the solid initiator is maintained under the fluid bed conditions until the particles of the solid reaction product are non-agglomerating and the solid product is recovered from the reaction zone as free-flowing particles.

3. The process of claim 2, wherein the contacting step is conducted in a vertically disposed reaction zone, the cyclic compound is a component of the fluidizing gas stream which is introduced into the zone at its lower end, the gas feed rate and the reaction temperature are adjusted so that the resulting particles of the solid reaction product are bead-like and non-agglomerating, and the product is separated from the fluidizing gas.

4. The process of claim 3, wherein the reaction product is allowed to accumulate at the lower end of the reaction zone and is withdrawn from the lower end of the zone, the gas being removed at the upper end of the reaction zone.

5. The process of claim 1, wherein the cyclic compound is cyclic carboxylic ester or a lactam, the cyclic ester being at least one of a lactone, an oxalate or a carbonate.

6. The process of claim 5 wherein the lactone is (a) a cyclic ester of a hydroxycarboxylic acid and/or (b) a dimeric cyclic ester of an alpha-hydroxycarboxylic acid.

7. The process of claim 6, wherein the dimeric cyclic ester has the formula:

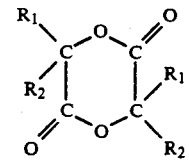

where each R group is independently H, a $C_1$–$C_6$ hydrocarbyl or a substituted $C_1$–$C_6$ hydrocarbyl radical.

8. The process of claim 7, wherein each of the R group when other than hydrogen is a $C_1$–$C_3$ alkyl group.

9. The process of claim 8, wherein the alkyl groups when present are methyl groups.

10. The process of claim 9, wherein the dimeric cyclic ester is glycolide ($R_1$=H, $R_2$=H) and/or a lactide ($R_1$=H, $R_2$=methyl).

* * * * *

UNITED STATES PATENT AND TRADEMARK OFFICE
CERTIFICATE OF CORRECTION

PATENT NO. : 5,288,841
DATED : February 22, 1994
INVENTOR(S) : Bellis, et. al.

It is certified that error appears in the above-indentified patent and that said Letters Patent is hereby corrected as shown below:

Title page, item [75] inventor: add Robert P. Collier---.

Signed and Sealed this

Second Day of January, 1996

Attest:

BRUCE LEHMAN

*Attesting Officer*           *Commissioner of Patents and Trademarks*